United States Patent Office 3,816,529
Patented June 11, 1974

3,816,529
N-CARBAMOYLETHYL AROMATIC AMINE COMPOUNDS
Frank Fred Loffelman, Middlesex, N.J., assignor to American Cyanamid Company, Stamford, Conn.
No Drawing. Continuation-in-part of abandoned application Ser. No. 825,434, May 16, 1969, which is a continuation-in-part of application Ser. No. 693,720, Dec. 27, 1967, now Patent No. 3,503,953, which is a continuation-in-part of application Ser. No. 420,448, Dec. 22, 1964, which in turn is a continuation-in-part of application Ser. No. 335,682, Jan. 3, 1964, both now abandoned. This application Feb. 24, 1971, Ser. No. 118,511
Int. Cl. C07c *103/28*
U.S. Cl. 260—558 A
4 Claims

ABSTRACT OF THE DISCLOSURE

N-carbamoylethyl aromatic amines are provided which have the formula

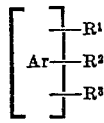

where Ar is a radical of the benzene, biphenyl or naphthalene series; $R^1$ is the group

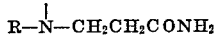

where R is hydrogen, methyl, ethyl, 2-hydroxyethyl or 2-carbamoylethyl; $R^2$ is amino, nitro or 2-carbamoylethylamino; and $R^3$ is amino, nitro, hydrogen, halo, lower alkyl, lower alkoxy, lower alkylamino, lower dialkylamino or 2-hydroxyethylamino; and acid addition salts thereof. These compounds are useful as direct or oxidation dyes for keratinaceous materials such as hair and fur or as intermediates in the preparation of dyes including methylolated, alkoxymethylolated or acyloxymethylolated dyes which chemically bond to polymeric substrates such as cellulose.

CROSS REFERENCES TO RELATED APPLICATIONS

This application is a continuation-in-part of application Ser. No. 825,434, filed May 16, 1969, now abandoned, which in turn is a continuation-in-part of application Ser. No. 693,720, filed Dec. 27, 1967, now U.S. Pat. No. 3,503,953, the latter being a continuation-in-part of application Ser. No. 420,448, filed Dec. 22, 1964, now abandoned, which in turn is a continuation-in-part of application Ser. No. 335,682, filed Jan. 3, 1964, also now abandoned.

THE INVENTION

This invention relates to carbamoylethylated aromatic amines of the Formula I:

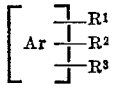

where Ar is a radical of the benzene, biphenyl or naphthalene series; $R^1$, $R^2$ and $R^3$ are monovalent groups as follows: $R^1$ is

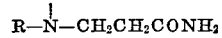

where R is hydrogen, methyl, ethyl, 2-hydroxyethyl, or 2-carbamoylethyl; $R^2$ is amino, nitro or 2-carbamoylethylamino; $R^3$ is hydrogen, chloro, fluoro, lower alkyl, lower alkoxy, nitro, amino, 2-hydroxyethylamino, lower alkylamino or lower dialkylamino.

The compounds of the invention also include the acid addition salts of compounds of the above formula, including organic and inorganic acid addition salts. The inorganic acids are preferred, typical examples being sulfuric, hydrochloric, phosphoric, nitric, and boric. Organic acids include both the mono- and polycarboxylic acids such as formic, acetic, propionic, capric, stearic, benzoic, malonic, succinic, and phthalic.

The compounds of Formula I or salts thereof may be prepared by at least three methods. In the first method an aromatic amine or aromatic nitromine is reacted with acrylamide in acetic acid (dilute or glacial, 10–100%) at an elevated temperature, preferably from about 50° C. to about 120° C., to give a product wherein one or more of the amino hydrogen atoms is replaced by a carbamoylethyl group.

In a second method, an aromatic nitroamine is reacted with acrylamide at about 25° C. to 145° C. in a polar, non-hydroxylated solvent such as dimethylformamide and in the presence of a basic catalyst having a $pK_b$ (negative logarithm of the basicity dissociation constant) of less than 10 to give a product having a nitro group and at least one propionamide group. Typical of the basic catalysts are quaternary ammonium hydroxides such as benzyl trimethyl ammonium hydroxide and alkali metal alkoxides such as sodium or potassium tertiary butoxide or methoxide. The basic catalyst is employed in catalytic amounts such as 0.01–0.5 mol of catalyst per mol of aromatic nitroamine reactant, preferably 0.02–0.04 mol, same basis. This method is the subject of a copending application Ser. No. 825,427, filed on May 16, 1969, on behalf of Richard Boardman Toothill.

In a third method, the nitro-substituted products may be prepared from the corresponding halo-and-nitro-substituted aromatic compounds by reaction with 3-aminopropionamide, 3 - N - [methyl(or ethyl)amino]propionamide, 3 - N - (2 - hydroxyethylamino)propionamide or iminobispropionamide in a lower alkanol such as ethanol in the presence of a weak base such as sodium bicarbonate, pyridine or triethanolamine. The reaction is conducted at elevated temperature, preferably reflux, and the appropriate aminopropionamide group replaces the halo group.

In the second method of preparation, where the starting material is an aromatic nitro diamine or an aminonitrophenol ether, a lower alkanol such as ethanol is also present and the reaction temperature is from about 60° C. to reflux.

In the first and second above methods, one or both hydrogen atoms on the amino groups of the starting material are replaced by one or two carbamoylethyl groups to give one to three mono- or di-carbamoylethyl groups in the product. The number of such groups in the product will depend, of course, on variables such as the number of amino and other groups in the reactant, mol ratios of reactants, and conditions of temperature and reaction medium. One exception to this generalization occurs when the reactant contains a single amino group and a single nitro group. In this instance the nitro bispropionamide product results only by the second method above.

In the third method of preparation, those reactants in which the halo group is ortho or para to the nitro group are preferred. Here again the degree of aminopropionamide, N-mono-substituted aminopropionamide, or iminobispropionamide substitution will depend on choice of starting material (the number of active halogen atoms), reactant mol ratios, and other reaction conditions, except as described above.

Where the product of the three methods described above contains at least one nitro group, one or more of the nitro groups may be reduced to amino by known procedures such as reaction with hydrogen gas at superatmospheric pressures over palladium on carbon in ethanol.

As noted above, the type and degree of substitution in the compounds of the invention will depend primarily on choice of reactants and reactant mol ratios. Thus, the relationship of $R^1$, $R^2$, and $R^3$ may be ortho, meta, or para, or any combination thereof, with those limitations readily apparent to the skilled chemist. Regarding their utility as dyes for keratinaceous materials, however, those compounds are preferred in which $R^1$ and $R^2$ are ortho or para.

Representative of the aromatic nitroamine reactants useful in preparing the compounds of the invention are the following: anilines such as 2-nitro, 3-nitro, 4-nitro, 2- or 3-chloro - 4 - nitro-, 2- or 3-methyl-4-nitro, 2- or 3-methoxy - 4 - nitro, and 2,4 - dinitro-aniline; naphthylamines such as 1-amino-2-nitro-, 2 - amino - 1 - nitro, 2 - amino - 3 - nitro-, 1-amino - 8 - nitro-, and 1-amino-2,4 - dinitro - naphthalene; and biphenylamines (xenylamines) such as 2-amino-2'-nitro-, 4-amino-4'-nitro, 4-amino-3-nitro-, and 4,4'-diamino-3,3'-dinitro-biphenyl.

Representative aromatic polyamine reactants are the following: phenylenediamines such as 1,2-diaminobenzene, 1,3 - diaminobenzene, 1,4 - diaminobenzene, 1,4-diamino-2-methylbenzene, 1,4 - diamino - 2 - methoxybenzene, 2-chloro - 1,4 - diaminobenzene, 1,4 - diamino-2-nitrobenzene; diaminonaphthalenes such as 1,2 - diamino-, -,4-diamino-, 1,8 - diamino-, 2,3 - diamino-, 2,6 - diamino-, 1,4 - diamino - 2 - nitro, and biphenylamines such as 2,2'-diamino-, 4,4' - diamino-, 4,4' - diamino - 3,3' - dinitro-, 3,4-diamino and 3,3',4,4'-tetramino-biphenyl.

Typical aminonitrophenol ether reactants are the following: 2 - methoxy - 4 - (5 or 6)nitroaniline, 3-methoxy-2-(4 or 5)nitroaniline, 4 - methoxy-2- (or 3) nitroaniline, 2-ethoxy - 4 - (5 or 6)nitroaniline, 3-ethoxy - 4 - nitro-aniline, 4-ethoxy-2-(or 3)nitroaniline and 5-ethoxy-2-(or 3)nitroaniline.

It is often desirable to isolate the compounds of Formula I above as acid addition salts since the salts tend to be more stable to air oxidation, particularly where the products have one or more amino groups. This is done after carbamoylethylation is complete and after the product has undergone further reduction to the extent intended, by clarifying the solution of the final product, and adding dilute or concentrated mineral acid, preferably hydrochloric or sulfuric.

Given the above description, the remaining details of the methods of preparation will be readily apparent. For example, conditions such as equivalent solvents and catalysts, order of addition, concentration of reactants and catalysts in the reaction medium, temperature, pressure, workup and isolation procedures, are routine. Likewise, the starting materials are known and, for the most part, commercially available.

As disclosed in the parent application Ser. No. 693,720, filed Dec. 27, 1967, now U.S. Pat. No. 3,503,953 and earlier applications of which Ser. No. 693,720 is a continuation-in-part, the compounds of this invention are useful in the synthesis of dyes which can be chemically bonded to polymeric substrates. Parent application Ser. No. 693,720 discloses general and specific methods of forming the methylolated, alkoxymethylolated or acyloxymethylolated derivatives of the compounds of this invention. The parent case fully discloses how the derivatives may be formed from the compounds of the present invention since all of the present compounds provide at least one 2-carbamoylethylamino group, an essential condition for synthesis of the derivatives. Example 46 below illustrates preparation of one such derivative. The entire disclosure of said parent case is incorporated herein by reference.

As disclosed in said parent case, said derivatives are especially useful for dyeing polymeric materials characterized by having reactive hydrogens. They show exceptionally high color yield when properly applied and can be applied either alone or simultaneously with textile-improving agents to impart both color and wrinkle-recovery in one step.

Among the polymeric materials which are very suitably treated with a dyes of the present invention are cellulosics such as rayon and cotton, superpolyamides such as nylon, natural proteinaceous materials such as wool, silk, casein, zein and hair, and synthetic resins such as the phenolics.

The method by which the derivatives are applied follows conventional techniques for the use of known methylolated dyes. The dye is dissolved in an aqueous medium with an acid catalyst and the fabric or fiber is immersed therein. After a suitable period of immersion, the fabric or fiber is removed, dried, and then cured by heating to fix the dye to the substrate.

The compounds of this invention are also useful as dyestuffs, particularly for dyeing keratinaceous materials. In regard to the dyeing of keratinaceous fibers, particularly human hair, the compounds comprise two classes: direct dyes and oxidation dyes. Those compounds wherein at least one of $R^2$ and $R^3$ is nitro are direct dyes; those compounds devoid of nitro groups or wherein at least one of $R^2$ and $R^3$ is amino or alkoxy are oxidation dyes or oxidation dye modifiers. Compounds containing both a nitro group and an amino or alkoxy group impart color directly.

The hair dye utility of the compounds of this invention is based not only on the ability of these compounds to impart a wide variety of colors to hair, depending on the compound employed or upon combination with known color modifiers, but also on other required properties which they possess such as the following: solubility or dispersibility in a wide variety of cosmetic vehicles, substantivity to the hair, substantially no tendency to sublimation on the hair, substantial stability in dye baths, dyeability at ambient temperature, uniform and level dyeing properties, and good reproducibility of dyeing properties including color fastness and wear fastness. The oxidation dye compounds of this invention are superior to the many N-alkylated derivatives of phenylenediamine compounds whether used alone or in mixtures with commercially available oxidation dyes or modifiers. Likewise, the direct dyeing compounds of this invention have properties superior to nitro and other direct hair dyes, have better solubility and strength (especially over homologous acetamide dyes of Example 47) provide brilliant colors, dye rapidly and levelly, and are useful whether the hair be virgin, bleached or permanently waved.

Especially noteworthy properties of these compounds besides their solubility are the variety and depth of colors they can impart to hair and the lightfastness of the colors. The superior lightfastness is discernible even when the compounds are admixed with commercial hair dyes. These properties appear to result primarily from the presence of the N-carbamoylethylamino group in the compounds, although they are enhanced by the presence of the other groups defined by $R^2$ and $R^3$ since these groups (except hydrogen) are known chromophores or auxochromes. Indeed, the dye chemist, given the present disclosure, can easily substitute many other known chromophore and auxochrome groups for those defined by $R^2$ and $R^3$. For example, chromophore groups generally contain electronegative atoms or groups of atoms and include groups containing sulfonyl, carbonyl, thiocarbonyl, azo, and groups containing ethylenically unsaturated carbon atoms. Similarly, the dye chemist would known how to substitute on the aromatic ring other auxochrome (electron donating) groups such as primary and secondary amino, alkoxy, aryloxy, or aralkyloxy groups.

The compounds of this invention may be admixed with a wide variety of known materials and applied to the hair by known methods to achieve superior dyeing effects. For example, the compounds which operate as oxidation dyes dissolve readily in a suitable aqueous medium, which may contain ingredients listed below, and adjusted to the desired pH. The resulting composition is then mixed with about equal parts of a peroxide solution such as 6% hydrogen peroxide or solutions of equivalent strength containing urea peroxide, melamine peroxide, or persalts such as bromate, perborate, percarbonate, or persulfate. Depending on the peroxide concentration and pH, the resulting composition will bleach as well as dye the hair.

The dye solution may also contain other ingredients commonly employed in the dyestuffs art. These include non-toxic organic solvents miscible with water such as benzyl, ethyl and isopropyl alcohols; stabilizers against air oxidation such as sodium sulfite; emulsifiers and surfactants for dye solubilization and color absorption; opacifying and thickening agents; and color modifiers.

The color modifiers encompass the whole field of known oxidation and direct dyes. Included among the known oxidation dye color modifiers are the phenols (amino-, nitro- or polyhydroxy phenols) such as pyrogallol, hydroquinone, p-hydroxy anisole, resorcinol, phloroglucinol, pyrocathechol, 2,4 - dinitrophenol, o-aminophenol, m-aminophenol, p-aminophenol, 2,4-diaminophenol, 2,6-diaminopyridine, hydroxy pyridine, m-diamino anisole sulfate, and the like; and aromatic diamines such as o-, m- and p-phenylene diamine, 2,4-diaminoanisole, o-nitro-p-phenylene diamine, p-toluylene diamine, and the like.

The compounds of this invention may be employed singly or in admixture, with or without one or more of the known color modifiers and other additives, to give the desired tones. The compounds are effective as hair dyes over a wide pH range, from about 2 to about 12, but a pH of at least about 7 is preferred, more particularly in the range of from about 7.5 to about 10. Any water-dispersible basic material which is compatible with the balance of the dye composition may be employed, in an amount which will provide the desired pH. Ammonium hydroxide is preferred but other basic compounds are useful, such as the alkali and alkaline earth metal hydroxides, carbonates or bicarbonates; amines such as primary aliphatic diamines (ethylenediamine, 1,2-diaminopropane, and the like), alkanolamines (ethanolamine, diethanolamine, and the like), and heterocyclic amines (morpholine, piperidine, piperazine, and the like). The pH may also be adjusted with acidic compounds, including organic or inorganic acids or salts thereof, such as sulfuric, formic, acetic or citric acid, ammonium sulfate, sodium dihydrogen phosphate, or potassium bisulfate.

Methods and compositions relating to the use of the compounds of this invention in dyeing fibrous materials, particularly keratinous materials such as animal and human hair are the subject of a copending application Ser. No. 825,428, filed on May 16, 1969, on behalf of A. P. Paul.

The following examples are provided for illustrative purposes and may include particular features of the invention. However, the examples should not be construed as limiting the invention, many variations of which are possible without departing from the spirit or scope thereof.

EXAMPLE 1

3-p-nitroanilinopropionamide

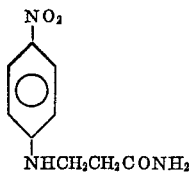

To 100 ml. glacial acetic acid is added in portions, 13.8 g. (0.1 mole) p-nitroaniline and 7.1 g. (0.1 mole) acrylamide. After completion of addition the solution is stirred at 80° C. for ten hours and ambient temperature for one hour. The solution is poured with stirring into 1500 ml. water. The precipitate is collected by filtration, washed with 500 ml. water and dried in a steam oven to yield 12.6 g. of crude product. Removal of unreacted p-nitroaniline is effected by leaching several times with small portions of ethyl acetate and yields 5.5 g. 3-p-nitroanilinopropionamide, a yellow product, melting at 171.5–173° C.

When this product is applied to albino, bleached or permanently waved hair from an alkaline vehicle in a concentration of 0.5%, a bright yellow shade is obtained after 10 minutes at ambient temperature.

EXAMPLE 2

3-(p-aminoanilino)propionamide

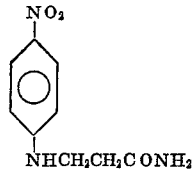

To a Parr bottle kept in a nitrogen atmosphere is added 200 mg. 10% Pd/C (palladium on carbon) catalyst which is immediately covered with 20 ml. ethanol. A warm slurry of 12.0 g. (0.057 mole) 3-p-(nitroanilino)propionamide (such as prepared in Example 1) in 200 ml. ethanol is added. Reduction is carried out on a Parr shaker at 40 p.s.i. of hydrogen without heating. Theoretical hydrogen take-up is accomplished within two hours. The catalyst is removed by gravity filtration followed by vacuum filtration through a Hyflo cake. The filtrate is taken to dryness on a rotary evaporator to yield 9.0 g. 3-(p-aminoanilino)propionamide, tan crystals, melting at 94–95.5° C.

Dissolved in an alkaline vehicle, in which it has very good solubiilty, in a concentratoin of 4% and applied to virgin, bleached or permanently waved hair, a black shade with a slight brown hue is obtained. Swatches of hair thus dyed have excellent light stability after ten days of exposure to sunlight. The addition of a small quantity of p-hydroxyanisole, or 2,6-diaminopyridine in the presence of 2,5-dinitrophenol, results in a jet black shade of excellent light stability. Compounding with p-phenylenediamine results in a warm brown shade.

EXAMPLE 3

3,3'-(p-nitrophenylimino)bispropionamide

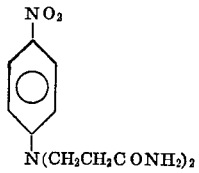

To 50 ml. dimethyl formamide is added in portions, 27.6 g. (0.2 mole) p-nitroaniline, 28.4 g. (0.4 mole) acrylamide and 200 mg. potassium-t-butoxide. After stirring 18 hours at ambient temperature, the solution is poured into 1500 ml. water. The precipitate is collected by filtration, washed with 500 ml. water and dried in a steam oven. Removal of unreacted p-nitroaniline is effected by leaching several times with small portions of ethyl acetate to yield 26.0 g. 3,3'-(p-nitrophenylimino) bispropionamide, a yellow powder, melting at 201.5–203° C. When applied to hair a yellow shade similar to but not as strong as that of Example 1, is obtained.

EXAMPLE 4

3,3'-(p-aminophenylimino)bispropionamide

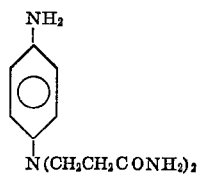

To a Parr bottle kept in a nitrogen atmosphere is added 200 mg. 10% Pd/C catalyst which is immediately covered with 20 ml. anhydrous methanol. A warm slurry of 10.0 g. (0.036 mole) 3,3'-nitrophenylimino)bispropionamide in 200 ml. purifier methanol is added. Reduction is carried out on a Parr shaker at 40 p.s.i. of hydrogen without heating. Theoretical hydrogen takeup is accomplished within two hours. The catalyst is removed by gravity filtration followed by vacuum filtration through a filter aid. The filtrate is taken to dryness on a rotary evaporator to yield 7.0 g. 3,3'-(p-aminophenylimino)bispropionamide, tan crystals, melting at 140–141° C.

EXAMPLE 5

3-[4-(2-carbamoylethylamino)anilino]propionamide

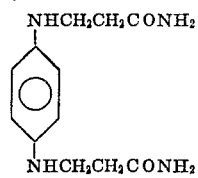

To 100 ml. ethanol under nitrogen is added in portions 10.8 g. (0.1 mole) p-phenylenediamine, 15.6 g. (0.22 mole) acrylamide and 5.0 ml. glacial acetic acid. The solution is refluxed under nitrogen for four hours and stirred at ambient temperature for one hour. The precipitate is collected by filtration, washed with ethanol and dried without heat in vacuo. Yield is 9.0 g. of 3-[4-(2-carbamoylethylamino)anilino]propionamide, a gray powder, melting at 163–165° C. When applied to albino hair in an alkaline vehicle, a yellow shade of medium depth is obtained.

EXAMPLE 6 p-Nitroaniline substituted for aniline in Example 6 of Spivack, U.S. Pat. No. 3,048,620, half quantities being used 69 g. (0.5 mole) of p-nitroaniline is dissolved in 75 ml. glacial acetic acid, the solution being heated to 85° C. 79 g. (1.1 moles) of acrylamide is added over a period of 45 minutes, in small portions of 1.5 g. On each addition, an endothermic reaction is noted; a rise of 3 to 4° occurs. The temperature is allowed to return to 85° C. before further additions. The reaction mixture during the time of addition changes from a thick slurry to a solution. After complete addition of the acrylamide, the mixture is heated at 80 to 82° C. for 6 hours. The reaction mixture so obtained is poured into 125 ml. water, neutralized with about 15 ml. 5 N sodium hydroxide solution and allowed to stand to complete precipitation. The precipitate is filtered off and dried to give 84.8 g. product. Thin layer chromatography comparison with known controls shows about equal parts starting material and 3-p-nitroanilinopropionamide, the compound of Example 1 above. No. 3,3'-(p - nitrophenylimino)bispropionamide (cf. Example 3 above) is present in the product.

In contrast, 46.5 g. (0.5 mole) aniline in the above process results in formation of anilino-bispropionamide. The latter does not dye hair at all.

EXAMPLE 7

3-(4-amino-3-nitroanilino)propionamide

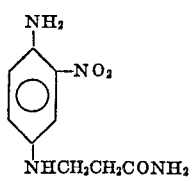

To 100 ml. ethanol is added 13.9 g. (0.1 mole) 2-nitro-p-phenylenediamine, 7.1 g. (0.1 mole) acrylamide and 10.0 ml. glacial acetic acid. The solution is heated at reflux for eighteen hours, and stirred without temperature control for one hour; the product is collected by filtration and washed with carbon tetrachloride. It is dried without heat in vacuo to yield 12.1 g. 3-(4-amino-3-nitroanilino)propionamide, as red-brown crystals, melting at 144.5–146.5° C. When applied to albino, virgin, bleached and permanently waved hair from alkaline medium, in 0.5% concentration, for ten minutes at ambient temperature, an intense bluish-red shade is obtained. This compound has excellent levelling properties.

It also has excellent solubility, permitting concentrated solutions and thus deeper shades. It is more soluble and gives much greater depth of shade than the homologous 2-(4-amino-3-nitroanilino)acetamide Compound of XI of Seemuller, U.S. Pat. No. 3,236,891, column 4, Example 3.

EXAMPLE 8

3,3'-(4-amino-3-nitrophenylimino)bispropionamide

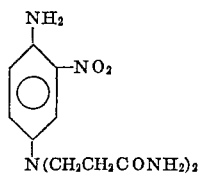

To 100 ml. ethanol is added 13.9 g. (0.1 mole) 2-nitro-p-phenylenediamine, 28.4 g. (0.4 mole) acrylamide and 10.0 ml. glacial acetic acid. The solution is heated at reflux for twenty-four hours and stirred at ambient temperature for one hour. The product is collected by filtration, washed with carbon tetrachloride and dried without heat in vacuo to yield 10.5 g. 3,3'-(4-amino-3-nitrophenylimino)bispropionamide, as red-brown crystals, sinters at 210° C., melting at 214–215° C.

When applied to hair, in a manner similar to the compound of Example 7, a similar shade but not as strong, is obtained.

EXAMPLE 9

3-(2,6-dinitroanilino)propionamide

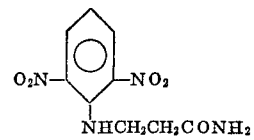

To 250 ml. benzene is added 10.0 g. (0.039 mole) of the known 2,6-dinitroanilinopropionic acid. The latter may be prepared by reacting 2,6-dinitrochlorobenzene with β-alanine in refluxing acetonitrile for twenty hours. It is poured into 250 ml. ice water, acidified with 50 ml. 5 N hydrochloric acid, filtered and recrystallized from methanol, M.P. 145–146.5° C. To the stirred solution is added dropwise, 10.0 ml. (0.084 mole) thionyl chloride in 20 ml. benzene. As the addition continues, the reaction mixture is gradually heated to reflux. When all the thionyl chloride is added and the mixture heated at reflux for about twenty minutes, a solution is obtained. The whole is heated at reflux for 2 hours and filtered hot. The filtrate is evaporated. The oily acid chloride residue is poured with rapid stirring into iced 125 ml. concentrated ammonia. The resultant crude amide product is separated chromatographically from the free acid starting material using silica gel and acetone-benzene 50/50 as eluent. Evaporation of the eluate to 50 ml. volume and cooling gives golden yellow needles, m. 137–138° C.

EXAMPLE 10

3-(4-fluoro-3-nitroanilino)propionamide (A)

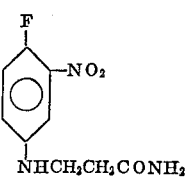

(A)

(A) To 100 ml. ethanol is added 10 g. (0.06 mole) 3-nitro-4-fluoroaniline, 5 g. (0.07 mole) acrylamide and 0.5 ml. concentrated sulfuric acid. The whole is heated at reflux for three hours with stirring, 5 g. acrylamide added and heated an additional three hours at reflux. After cooling to ambient temperature, water is added to complete precipitation of the product. It is collected and recrystallized from methanol to give 8.4 g. yellow-orange needles, M.P. 132–133.5° C.

(B) If in the above procedure, 2-fluoro-5-nitroaniline is used, one obtains the 3-(2-fluoro-5-nitroanilino)propionamide, M.P. 177–178° C.

Compounds (A) and (B) are useful intermediates for the preparation of the substituted amino group containing dyes of this invention.

EXAMPLE 11

3-(4-nitro-o-toluidino)propionamide

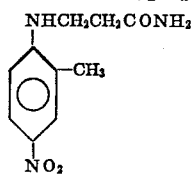

To 40 ml. dimethylformamide is added in portions, 7.6 g. (0.05 mole) 2-methyl-4-nitroaniline, 3.6 g. (0.05 mole) acrylamide and 200 mg. potassium-t-butoxide. After addition is complete the solution is stirred at reflux for six hours. It is poured with stirring into 1500 ml. water. The precipitate is collected by filtration, washed with 500 ml. water and dried in a steam oven to yield 3.9 g. of crude product. Separation of 3 - (4-nitro-o-toluidino)propionamide from starting material and by-products is effected by column chromatography. The chromatography system used is as follows: 100 g. silica gel packed in benzene. Eluted with 1:1 ethyl acetate-benzene, benzene, 1:10 chloroform-benzene, 1:1 chloroform-benzene, chloroform, 1:1 ethyl acetate-chloroform, ethanol. From the column 0.49 g. of 3-(4-nitro-o-toluidino)propionamide is obtained, as a yellow powder, melting at 165.5°–167.0° C.

EXAMPLE 12

3-(4-nitro-o-anisidino)propionamide

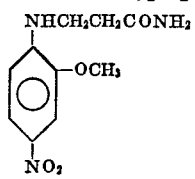

A mixture of 33.6 g. (0.2 mole) 4-nitro-o-anisidine, 100 ml. glacial acetic acid, 15.6 g. (0.22 mole) acrylamide, 0.5 g. cupric acetate and 0.1 g. hydroquinone, is heated at reflux for 6 hours, cooled to room temperature overnight and filtered. The solids are recrystallized from acetone-benzene mixtures to yield 41 g. 3-(4-nitro-o-anisidino)propionamide as a yellow crystalline solid, melting at 157–157.5° C.

EXAMPLE 13

3-(2-chloro-4-nitroanilino)propionamide

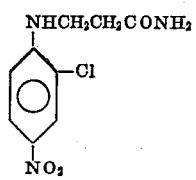

To 40 ml. dimethylformamide is added in portions, 8.6 g. (0.05 mole) 2-chloro-4-nitroaniline, 7.1 g. (0.05 mole) acrylamide and 200 mg. potassium-t-butoxide. After heating at the reflux for four hours, the cooled solution is poured into 1500 ml. water. The precipitate is collected by filtration, washed with 500 ml. water and dried in a steam oven to yield 10.2 g. crude product. A 2.0 g. sample is recrystallized from water, then ethanol, to yield 1.4 g. of 3-(2-chloro-4-nitroanilino)propionamide, as a yellow powder, melting at 147.5–148.5° C.

EXAMPLE 14

3-(2,4-dinitroanilino)propionamide

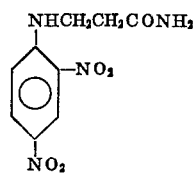

To 125 ml. dimethylformamide is added 45.5 g. (0.25 mole) 2,4-dinitroaniline, 18.0 g. (0.25 mole) acrylamide and 500 mg. potassium-t-butoxide. After heating at the reflux for eight hours, the cooled solution is poured into 2000 ml. benzene, stirred for one hour, filtered, washed with 500 ml. benzene and dried in a steam oven to yield 34.0 g. crude product. A 2.0 g. sample after recrystallization from ethanolethyl acetate, yields 1.5 g. 3-(2,4-dinitroanilino)propionamide, a yellow powder, melting at 123–124.5° C.

EXAMPLE 15

3-(4-nitro-1-naphthylamino)propionamide

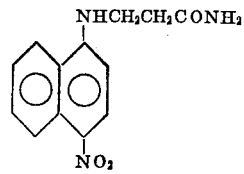

To 50 ml. dimethylformamide is added 18.8 g. (0.1 mole) 1-amino-4-nitro naphthalene, 7.1 g. (0.1 mole) acrylamide and 200 mg. potassium-t-butoxide. After heating at reflux for eight hours and cooling, the solution is drowned in 1500 ml. water, filtered, washed with 500 ml. water and dried in a steam oven to yield 7.1 g. crude product. A 2.0 g. sample after recrystallization from methanol, ethanol and acetonitrile, yields 0.42 g. 3-(4-nitro-1-naphthylamino)propionamide, orange crystals, melting at 205–206.5° C.

When the product is reduced using the procedure of Example 2, the nitro group of the above product is reduced to an amino group and the product obtained is 3-(4-amino-1-naphthylamino)propionamide.

EXAMPLE 16

3-(4'-nitro-4-biphenylylamino)propionamide

If in Example 15, 0.1 mole of 1-amino-4-nitronaphthalene is replaced with 21.4 g. (0.1 mole) 4-amino-4'-nitrobiphenyl and the rest of the procedure of Example 15 is followed, the product obtained is 3-(4'-nitro-4-biphenylylamino)propionamide. Doubling the proportion of acrylamide provides the 3,3'-[(4'-nitro-4-phenylyl)imino]bispropionamide. Using the procedure of Example 2, the nitro group in either compound is reduced to an amino group to provide 3 - (4-aminobiphenylylamino)propionamide provides the 3,3'-[(4'-nitro-4-phenylyl)imino]bispionamide, respectively.

EXAMPLE 17

3-(3-nitro-p-toluidino)propionamide

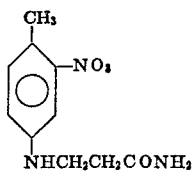

To a mixture of 80 ml. toluene and 20 ml. glacial acetic acid is added 30.4 g. (0.2 mole) 3-nitro-p-toluidine. The mixture is taken to reflux with stirring and a solution of 15.64 g. (0.22 mole) acrylamide in acetone is added over 1.5 hours. The acetone is allowed to distill as it is being added. An additional 100 ml. toluene is then added and the reaction is stirred at reflux for 2 hours, cooled to room temperature and chromatographed on a short alumina column. The first fraction is discarded and the second fraction on evaporation results in 7.0 g. of 3-(3-nitro-p-toluidino)propionamide, a yellow powder, melting at 118.5° C.

EXAMPLE 18

3-(3-amino-p-toluidino)propionamide dihydrochloride

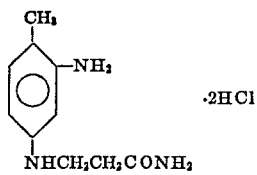

To 200 ml. ethyl alcohol is added 10 g. 3-(4-methyl-3-nitrophenyl)propionamide and a catalytic amount (0.05 g.) of 10% palladium on carbon. The mixture is shaken in a Parr apparatus for two days under 40 p.s.i. of hydrogen. The reaction is filtered and the filtrate is saturated with hydrogen chloride. The solids are filtered resulting in 12 g. 3 - (3-amino-p-toluidino)propionamide dihydrochloride, a white powder, melting at 222° C. (dec.).

EXAMPLE 19

3-(5-nitro-o-toluidino)propionamide

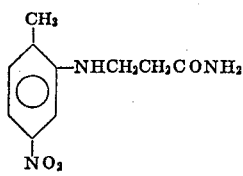

The above compound is prepared substantially as described in Example 17 except that 5-nitro-o-toluidine is substituted for the 3-nitro-p-toluidine. This compound melts at 168–169.5° C.

EXAMPLE 20

3-(5-amino-o-toluidino)propionamide dihydrochloride

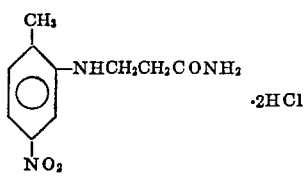

If, in Example 18, one substitutes an equal quantity of 3 - (5-nitro-o-toluidino)propionamide for 3-(4-methyl-3-nitrophenyl)propionamide, there is obtained 5.26 g. of 3-(5-amino-o-toluidino)propionamide dihydrochloride as a white powder, melting at 207.5–208.5° C.

EXAMPLE 21

3-(5-nitro-o-anisidino)propionamide

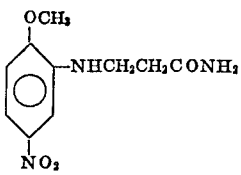

To a refluxing mixture of 33.6 g. (0.2 mole) 2-amino-4-nitro anisole and 100 ml. glacial acetic acid, is added 15.6 g. (0.22 mole) acrylamide in portions over 15 minutes. After heating at the reflux for an additional hour, the reaction mixture is treated with activated carbon, filtered, and evaporated under vacuum to the point of crystallization. The product is recrystallized from acetone to yield 6.9 g. 3-(5-nitro-o-anisidino)propionamide, a yellow crystalline solid, melting at 159–160° C.

EXAMPLE 22

3-(5-amino-o-anisidino)propionamide dihydrochloride

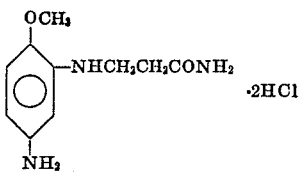

If, in Example 18, one substitutes 29 g. of 3-(5-nitro-o-anisidino)propionamide for 3 - (4-methyl-3-nitrophenyl)propionamide, there is obtained 14.68 g. 3-(5-amino-o-anisidino)propionamide dihydrochloride as a white powder, melting at 199–200° C. (dec.).

EXAMPLE 23

3-(2-amino-4-nitroanilino)propionamide

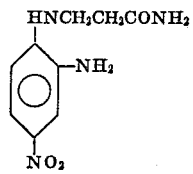

To a refluxing mixture of 38.1 g. (0.15 mole) 3-(2,4-dinitroanilino)propionamide and 500 ml. methyl alcohol, is added over 30 minutes, a solution of 60 g. (0.25 mole) sodium sulfide monohydrate, 19.5 g. (0.23 mole) sodium bicarbonate and 150 ml. water. After heating at reflux for an additional 2 hours, the reaction mixture is cooled to room temperature, stripped to dryness under vacuum and recrystallized from methyl alcohol to yield 26.2 g. 3-(2-amino-4-nitroanilino)propionamide, a dark reddish-brown crystalline solid, melting at 204–205° C.

EXAMPLE 24

3-(4-amino-o-toluidino)propionamide dihydrochloride

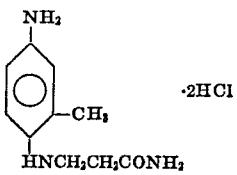

If in Example 18, one substitutes an equal quantity of 3 - (4-nitro-o-toluidino)propionamide for 3-(4-methyl-3-nitrophenyl)propionamide, then there is obtained 8.7 g. of 3-(4-amino-o-toluidino)propionamide dihydrochloride as a white powder, melting at 206° C. (dec.).

EXAMPLE 25

3-[(4-amino-1-naphthyl)amino]propionamide dihydrochloride

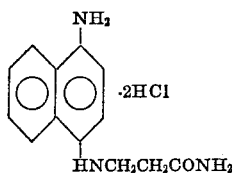

If in Example 18, one substitutes 2.2 g. 3-(4-nitro-1-naphthylamino)propionamide for 3-(4-methyl-3-nitrophenyl)propionamide, there is obtained 2 g. 3-[(4-amino-1-naphthyl)amino]propionamide dihydrochloride, as a white powder, melting at 290° C. (dec.).

EXAMPLE 26

3,3'-(3-nitro-p-tolylimino)bispropionamide

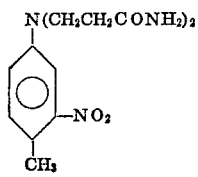

To a refluxing mixture of 7.1 g. (0.047 mole) 3-nitro-p-toluidine and 25 ml. acetic acid is added 3.91 g. (0.055 mole) acrylamide in portions over 1.5 hours. After heating at reflux for an additional 30 minutes, the reaction mixture is poured over ice, neutralized with 200 ml. 5 N caustic and extracted with 1 liter of chloroform. The aqueous layer is filtered and the solids recrystallized from acetone to yield 0.050 g. 3,3'-(3-nitro-p-tolylimino)bispropionamide as a pale yellow solid, melting at 197–198° C.

EXAMPLE 27

3,3'-(2-methoxy-5-nitrophenylimino)bispropionamide

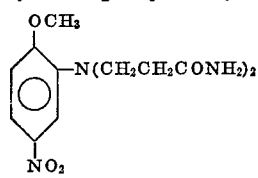

A mixture of 33.6 g. (0.2 mole) 5-nitro-o-anisidine, 150 ml. benzene, 10 ml. acetic acid, 15.6 g. (0.22 mole) acrylamide and 2 drops of concentrated sulfuric acid are stirred at ambient temperature, then taken to reflux for 30 minutes. After cooling to 50° C. the solids are filtered, washed with benzene and recrystallized from acetone to yield 3.95 g. 3,3'-(2-methoxy-5-nitrophenylimino)bispropionamide, a yellow crystalline solid, melting at 132–133° C.

EXAMPLE 28

3-(4-methylamino-2-nitroanilino)propionamide (A)

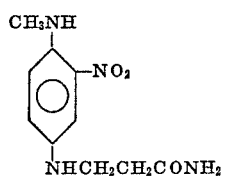

(A) A mixture of 4.0 g. (0.026 mole) 4-methylamino-2-nitroaniline, 4.0 g. (0.056 mole) acrylamide, 100 ml. ethanol and 5 ml. glacial acetic is heated at reflux until maximum carbamoylethylation has taken place, at least six hours, as determined by thin layer chromatography. Ethanol is stripped and the residue poured over 100 ml. ice. The whole is evaporated stirred with 20 ml. cold water, the product collected and dried to give 2.5 g., M.P. 161–162° C.

(B) If in the above procedure (A), 5 g. 4-isopropyl-2-nitroaniline is used, one obtains the 3-(4-isopropylamino-2-nitroanilino)propionamide, M.P. 109–110.5° C.

(C) A mixture of 4.7 g. (0.02 mole) Compound 28(A), 7.2 g. (0.06 mole) 2-bromoethanol and 100 ml. 30% aqueous isopropanol at 70–75° C. is treated dropwise with 6.0 ml. 5 N sodium hydroxide solution and heated at reflux for two hours. On cooling, an oil product forms which is collected and crystallized from hot water as purple needles, M.P. 148.5° C. This is 3-[N-(2-hydroxyethyl)-4-methylamino-2-nitroanilino]propionamide.

EXAMPLE 29

3-[2-(2-hydroxyethylamino)-5-nitroanilino]propionamide (A)

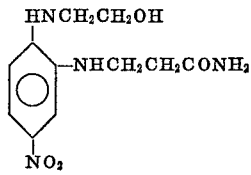

(A) A mixture of 1.0 g. (0.0044 mole) of the compound of Example 10(B), 5 ml. monoethanolamine and 10 ml. ethanol are heated at reflux for two hours, cooled and poured over ice. The whole is neutralized with 5 N hydrochloric acid solution and cooled. The product is collected and recrystallized from methanol as orange needles, M.P., 165–167° C.

(B) The isomeric 3-[4-(2-hydroxyethylamino)-3-nitroanilino]propionamide is prepared by heating 5 g. compound of Example 10(A) with 20 ml. monoethanolamine in 100 ml. water at 70–80° C. for 3 hours and cooling. It is collected and purified by dissolving in methanol, treating with concentrated hydrochloric acid to disappearance of a blue color and adding ethyl acetate to a cloud point which precipitates the product; recrystallized from water it melts at 99–100° C.

EXAMPLE 30

3-(2-dimethylamino-5-nitroanilino)propionamide (A)

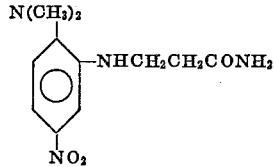

(A) A mixture of 2.0 g. (0.0088 mole) of the compound of Example 10(B) is mixed with 50 ml. 40% aqueous dimethylamine and heated at reflux for one hour. The whole gives 2.0 g. product which is recrystallized from hot water as orange plates, M.P. 124–5° C.

(B) By using the compound of Example 10(A) in the above procedure, an oil forms. This is collected, dissolved in hot methanol and precipitated as a hydrochloride salt, M.P. 160–1° C., by addition of conc. HCl solution. The compound may be recrystallized from a 1:5 methanol/ethyl acetate mixture to give an orange powder of the 3-(4-dimethylamino-3-nitroanilino)propionamide hydrochloride.

EXAMPLE 31

3-(2,4-dinitro-N-methyl anilino)propionamide

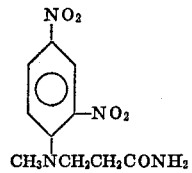

A mixture of 9.0 g. (0.045 mole) 2,4-dinitrochlorobenzene and 9.1 g. (0.09 mole) 2-methylaminoacrylamide in 100 ml. ethanol is heated at reflux until the reaction is complete. The mixture is allowed to cool and poured into ice. The product is filtered, dried and recrystallized from methanol to give 11.1 g. yellow needles, M.P. 134.5–136.5° C.

EXAMPLE 32

3-[N-(2-hydroxyethyl)-4-(2-hydroxyethylamino)-3-nitroanilino]propionamide

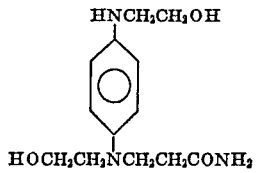

To a mixture of 5.3 g. (0.02 mole) of the product of Example 29(B), 7.2 g. (0.06 mole) 2-bromoethanol and 100 ml. 30% aqueous isopropanol, stirred at 70–75° C., is added 6.0 ml. 5 N sodium hydroxide solution. After three hours at 70–75° C., an additional 6.0 ml. sodium hydroxide solution is added and the whole heated for one hour. The reaction mixture is evaporated to an oil which is taken up in methanol and conc. hydrochloric acid solution added. The resultant solution is decolorized by activated charcoal. Ethyl acetate is added to a cloud point. The product, which precipitates on standing, is collected and dried to give a M.P. 168–170° C. (decomp.).

EXAMPLE 33

3-(2,4-diaminoanilino)propionamide

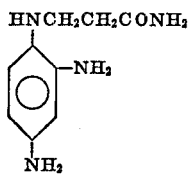

If in Example 2, one substitutes 10 g. 3-(2,4-dinitroanilino)propionamide for 3-(p-nitroanilino)propionamide, there is obtained 5.5 g. 3-(2,4-diaminoanilino)propionamide, as an off-white solid, melting at 127.5–129° C.

EXAMPLE 34

3-(3,4-diaminoanilino)propionamide dihydrochloride

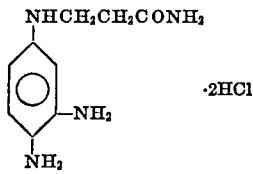

If in Example 18, one substitutes an equal quantity of 3-(4-amino-3-nitroanilino)propionamide for 3-(4-methyl-3-nitrophenyl)propionamide, there is obtained 11.6 g. of 3-(3,4-diaminoanilino)propionamide dihydrochloride, a white solid.

EXAMPLE 35

3-(4-amino-o-anisidino)propionamide dihydrochloride

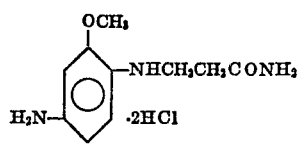

If in Example 18, one substitutes 5.15 g. 3-(4-nitro-o-anisidino)propionamide for 3-(4-methyl-3-nitrophenyl)propionamide, there is obtained 5.75 g. 3-(4-amino-o-anisidino)propionamide dihydrochloride, a white solid, melting at 184° C. (dec.).

EXAMPLE 36

3-(4-amino-2-nitroanilino)propionamide

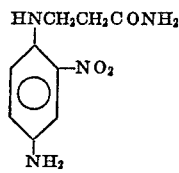

A mixture of 1 g. 5% platinum on carbon, 10 ml. concentrated hydrochloric acid, 200 cc. alcohol and 12.7 g. (.05 mole) 3-(2,4-dinitro anilino) propionamide is shaken in a Parr apparatus for 3 hours; the solids are filtered and washed with isopropanol and acetone. The solids are dissolved in 250 ml. water, basified with concentrated ammonium hydroxide, filtered, dried and recrystallized from acetone to yield 5.03 g. 3-(4-amino-2-nitroanilino)propionamide as a reddish brown crystalline solid, melting at 205–206° C.

EXAMPLE 37

3-(4'-amino biphenylylamino)propionamide

If, in Example 2, one substitutes 5 g. 3-(4'-nitro-4-biphenylamino)propionamide for 3 - (p - nitroanilino)propionamide, there is obtained 2.54 g. of 3-(4'-amino-biphenylamino)propionamide as an off-white solid, melting at 176.5–177° C.

EXAMPLE 38

Utility as oxidation dye (A) A dye composition is prepared as follows:

To 54.9 parts water is added 10 parts of the non-ionic dispersing agent isooctylphenyl(polyethoxy)ethanol, 0.1 part sodium sulfite and 4 parts lauric acid diethanolamide. The whole is heated with stirring to 70° C. during which 6 parts 3-(p-aminoanilino)propionamide (Example 2) is added. When solution of the dye is complete, the whole is cooled to 35° C. with stirring. To the solution of the dye is added 10 parts isopropanol, 10 parts oleic acid and 5 parts 28% ammonium hydroxide solution.

(B) One part dye composition of (A) above is mixed with an equal part of 6% hydrogen peroxide solution.

(C) Yellowish grey hair is contacted with the mixture of the composition of (B) without delay at ambient temperature for twenty to thirty minutes. The hair is then thoroughly rinsed, washed with a dilute shampoo and dried. The result is a deep brown-black uniform color of good fastness to light.

When the above procedure is applied to other compounds of the foregoing examples, the following results are obtained.

TABLE I

| Compound of example: | Color of dyed hair |
|---|---|
| 4 | Grey. |
| 5 | Yellow. |
| 6 | Rust. |
| 2+20 (or 22) | Blue. |
| 10(A) | Yellow. |
| 10(B) | Do. |
| 33 | Green. |
| 34 | Do. |
| 36 | Rust. |

EXAMPLE 39

Utility as direct dye

A dye composition is prepared by adding 0.5 part 3-(4-amino-3-nitroanilino)propionamide (Example 7) to a solution prepared by mixing 3 parts benzyl alcohol, 5 parts polyethoxylated oleylammonium chloride, 0.5 part ammonium phosphate, water to make 100 parts and heating to 70° C. The whole is cooled to ambient temperature.

Virgin albino hair is immersed in this composition for 10 to 15 minutes. The hair is rinsed with water, washed with a dilute shampoo and dried. The hair is dyed a reddish-blue shade.

When this procedure is used for the following nitro compounds of this invention, the result on albino hair is as follows.

TABLE II

| Compound of example: | Color of dyed hair |
|---|---|
| 1 | Bright yellow. |
| 3 | Yellow. |
| 7 | Bluish red. |
| 8 | Do. |
| 11–15 | Yellow. |
| 28(A) | Beige. |
| 28(B) | Dark beige. |
| 28(C) | Bluish beige. |
| 29(A) | Yellow orange. |
| 29(B) | Violet beige. |
| 31 | Yellow. |
| 36 | Red. |

EXAMPLE 40

| Compound of Example 2 | 6.0 |
|---|---|
| Sodium sulfite | .1 |
| Isopropyl alcohol | 10.0 |
| Oleic acid | 10.0 |
| Alkyl phenol/ethylene oxide condensate | 10.0 |
| Lauric acid diethanolamide | 4.0 |
| Ammonia (28%) | 5.0 |
| Water, q.s. to 100. | |

When an equal part of 6% H$_2$O$_2$ is admixed with the above composition and the resulting solution is applied to yellow grey hair over 20–30 minutes, the hair is uniformly dyed a deep brown black.

EXAMPLE 41

| Compound of Example 2 | 4.0 |
|---|---|
| Compound of Example 7 | 0.15 |
| 3,3'-(p-phenylenedinitrolo)tetrakispropionamide | 0.2 |
| Sodium sulfite | 0.1 |
| Oleic acid | 10.0 |
| Alkyl phenol ethylene oxide | 10.0 |
| Lauric acid diethanolamide | 4.0 |
| Ammonia (28%) | 5.0 |
| Water, q.s. to 100. | |

When admixed with H$_2$O$_2$ and applied to yellow grey hair as in Example 40, this composition uniformly dyes the hair in a dark bluish grey.

EXAMPLE 42

| Compound of Example 2 | 5.0 |
|---|---|
| 2,4-dinitro phenol | 0.4 |
| p-Hydroxy anisole | 1.0 |
| Sodium sulfite | 0.1 |
| Isopropyl alcohol | 10.0 |
| Oleic acid | 10.0 |
| Alkyl phenol ethylene oxide | 10.0 |
| Lauric acid diethanolamide | 4.0 |
| Ammonia (28%) | 5.0 |
| Water, q.s. to 100. | |

When admixed with H$_2$O$_2$ and applied to albino hair over 15–20 minutes as in Example 40, this composition uniformly dyes the hair a dark drab brown.

EXAMPLE 43

| Compound of Example 2 | 6.0 |
|---|---|
| o-Amino phenol | 0.4 |
| Pyrocatechol | 1.3 |
| Phloroglucinol | 0.5 |
| Meta diamino anisol sulfate | 0.1 |
| Sodium sulfite | 0.5 |
| Alkyl phenol ethylene oxide | 17.0 |
| Isopropyl alcohol | 18.0 |
| Oleic acid | 18.0 |
| Oleyl alcohol | 17.0 |
| Ammonia (28%) | 5.0 |
| Water, q.s. to 100. | |

When admixed with H$_2$O$_2$ and applied to albino hair as in Example 42, this composition uniformly dyes the hair black.

EXAMPLE 44

| Compound of Example 2 | 0.65 |
|---|---|
| o-Nitro p-phenylene diamine | 0.008 |
| Phloroglucinol | 0.16 |
| p-Amino phenol | 0.15 |
| Resorcinol | 0.14 |
| Sodium sulfite | 0.1 |
| Alkyl phenol ethylene oxide | 17.0 |
| Isopropyl alcohol | 18.0 |
| Oleic acid | 8.0 |
| Oleyl alcohol | 17.0 |
| Ammonium hydroxide | 5.0 |
| Water, q.s. to 100. | |

When admixed with H$_2$O$_2$ and applied to albino hair as in Example 42, this composition uniformly dyes the hair blonde.

EXAMPLE 45

(A) 3,3'-(p-aminophenylimino)bispropionamide hydrochloride

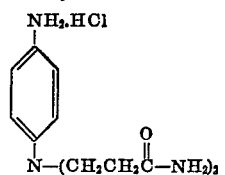

A well-stirred mixture of 400 ml. of water, 27.9 g. (0.5 m.) of iron powder and 3 ml. of glacial acetic acid is warmed to 70° C. and there is then added in portions 50.2 g. (0.18 m.) of the 3,3'-(p-nitrophenylimino)bispropionamide of Example 4. During addition, the temperature rises and is approximately 90° C. at the finish. The mixture is stirred at 90–95° C. for one-half hour after the addition is completed, cooled to 75° C. and sufficient sodium carbonate added to remove all dissolved iron salts. There is then added activated charcoal and the mixture is filtered hot through a diatomaceous earth filter. The filtrate is made just acid to Congo red indicator paper with concentrated hydrochloric acid and cooled to 0° C. The resulting precipitate is collected by filtration and dried in vacuo at 40° C. to yield 36.1 g. (70.3% of theory) of 3,3'-(p-aminophenylimino)bispropionamide hydrochloride, pink-tinged crystals, m. 203–204° C.

(B)

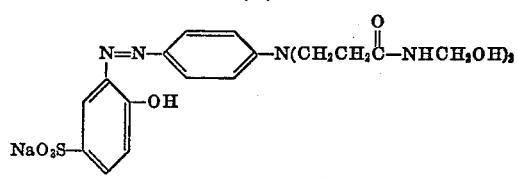

The cold aqueous diazonium solution derived from 14.34 g. (0.05 m.) of 3,3'-(p-aminophenylimino)bispropionamide hydrochloride prepared in part (A), is poured into a well-stirred solution at 15° C. comprised of 300 ml. of water, 20.8 g. (0.2 m.) of sodium carbonate and 11.51 g. (0.05 m.) of sodium 2-hydroxynaphthalene-6-sulfonate. The solution is allowed to reach ambient temperature, then warmed to 50° C. and sodium chloride added to precipitate the dye. The precipitate is collected by filtration and washed with 400 ml. of 20% brine solution. The wet cake is dissolved in 500 ml. of water at 60° C., the solution filtered through diatomaceous earth, and the filtrate poured into 3 liters of isopropyl alcohol.

The precipitate is collected by filtration, washed with isopropyl alcohol, followed by ethyl ether, and dried in vacuo at 45° C. to yield 14.01 g. of product.

A solution of 10.15 g. of the above product in 150 ml. of water is adjusted to pH 9.5, and there is then added 30 g. of 37% aqueous formaldehyde, the pH of which is first adjusted to 9.5. The reaction is stirred at 65° C. for six hours while maintaining the pH at 9.5 and then poured into a mixture of 3 liters of isopropyl alcohol and 800 ml. of ether. The mother liquor is decanted from the precipitate, and it is dissolved in 55 ml. of water for application to fiber.

A padding solution is made by mixing 20 ml. of the above dye solution with 1.5 ml. of 10% magnesium chloride solution and making the volume 50 ml. with water. The solution is padded on eight-square cotton, air-dried and cured for 1½ minutes at 350° F. The cured dyeing is soaped at the boil and dried. An attractive red brown hue is obtained. Excellent fastness (5) is shown by this dye in 3A Cotton wash test, acid and alkaline perspiration and wet pressing. Fixation of the dyestuff is 95% as evidenced by sulfuric acid extraction and spectrophotometric measurement of the dye solution.

EXAMPLE 46

Alternate direct dyeing procedure (cf. Example 39) and comparison with prior art compounds A mixture of 4 grams of a nonionic surfactant, polyoxyethylene (20) oleyl ether, 3 parts benzyl alcohol and 25 g. water is heated with stirring to 55° C. To this is added the dye compound in the amount given below. The whole is stirred 15 minutes at 55° C. Heat is removed, 68 g. water added and the whole allowed to come to ambient temperature. The solution mixture is divided into three equal portions, A, B, and C.

Solution A is adjusted to pH 4 with citric acid solution.
Solution B is adjusted to pH 7 with standard NaOH-KH$_2$PO$_4$ buffer solution for pH 7.
Solution C is adjusted to pH 9 with dilute ammonium hydroxide solution.

Approximately 5 ml. of A, B, and C solutions are placed on separate watch glasses. A dry albino hair tress weighing about 250 mg. is placed in each solution and spread with a spatula. The hair tress is dyed for 5 minutes at ambient temperature. It is turned over, respread and dyed an additional 5 minutes. The tress is then removed, rinsed and dried in warm air.

The observed solubility of the dye compound and the dyed hair for all pH are as follows.

TABLE III

| Compound | Amount, grams | Solubility, percent | Dyed hair Color | Strength, percent |
|---|---|---|---|---|
| Example 5 | 1.0 | 100 | Red-brown | 100 |
| 2-(4-amino-3-nitro-aniline)acetamide U.S. Pat. 3,236,891, Ex. 3, No. XI). | 1.0 | 70 | Dusty pink | 50 |
| Example 9 | 0.2 | 100 | Yellow | 100 |
| 3-(2,6-dinitroanilino)-N-methylpropionamide (Fr. Pat. 1,525,715 Ex. 6, No. I). | 0.2 | 35 | ___do___ | 50 |

I claim:
1. The compound 3 - (5-amino-o-anisidino)propionamide dihydrochloride.
2. The compound 3 - (5-amino-o-toluidino)propionamide dihydrochloride.
3. The compound 3-(3,4-diaminoanilino)propionamide dihydrochloride.
4. The compound 3-(4-amino-2-nitroanilino)propionamide.

References Cited

UNITED STATES PATENTS

| | | | |
|---|---|---|---|
| 3,048,620 | 8/1962 | Spivack | 260—558 |
| 3,236,891 | 2/1966 | Seemuller | 260—558 |
| 2,374,337 | 4/1945 | Dickey et al. | 260—558 |
| 3,634,509 | 1/1972 | Yates et al. | 260—558 |
| 2,346,013 | 4/1944 | Dickey | 260—558 |
| 3,572,743 | 10/1970 | Kalopissis et al. | 260—558 |

FOREIGN PATENTS

| | | | |
|---|---|---|---|
| 1,525,715 | 5/1968 | France | 260—558 |

HARRY I. MOATZ, Primary Examiner

U.S. Cl. X.R.

8—10; 260—201, 559 A

UNITED STATES PATENT OFFICE
CERTIFICATE OF CORRECTION

Patent No. 3,816,529　　　　　Dated June 11, 1974

Inventor(s) FRANK FRED LOFFELMAN

It is certified that error appears in the above-identified patent and that said Letters Patent are hereby corrected as shown below:

Column 2, line 11 "nitromine" should read -- nitroamine --.

Column 3, line 27 "-,4-diamino-," should read -- 1,4-diamino-, --.

Column 7, line 5 "purifier" should read -- purified --.

Column 10, line 74 "provides" should read -- and --.

Column 10, line 74 "[(4'-nitro-4-phenylyl)" should read
　　-- [(4'-amino-4-biphenylyl) --.

Column 11, Example 20, line 69, "NO$_2$" should read -- NH$_2$ --

Column 15, Example 32, the figure should be:

-- 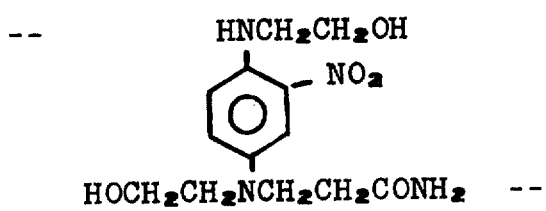　　　instead of　　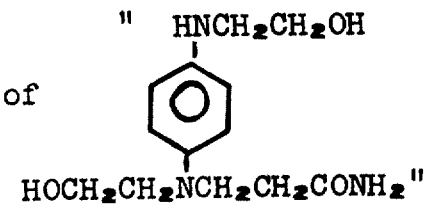

Column 18, Example 45 (B), the figure should be:

-- 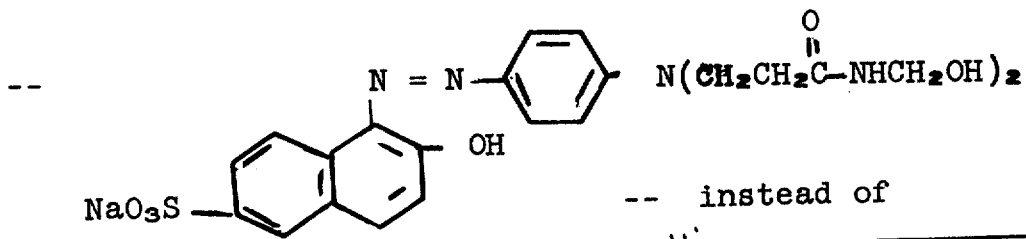

-- instead of

UNITED STATES PATENT OFFICE
CERTIFICATE OF CORRECTION

Patent No. 3,816,529          Dated June 11, 1974

Inventor(s) FRANK FRED LOFFELMAN

It is certified that error appears in the above-identified patent and that said Letters Patent are hereby corrected as shown below:

- 2 -

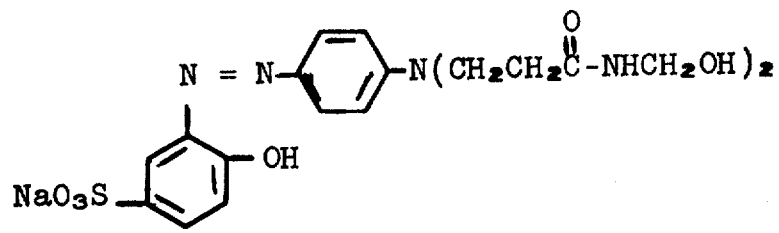

Signed and sealed this 1st day of October 1974.

(SEAL)
Attest:

McCOY M. GIBSON JR.
Attesting Officer

C. MARSHALL DANN
Commissioner of Patents